(12) United States Patent
Packles et al.

(10) Patent No.: US 10,898,760 B2
(45) Date of Patent: Jan. 26, 2021

(54) COORDINATING WORKOUTS ACROSS REMOTE EXERCISE MACHINES

(71) Applicant: Peloton Interactive, Inc., New York, NY (US)

(72) Inventors: David Owen Packles, Brooklyn, NY (US); Joseph Intonato, Brooklyn, NY (US); Thomas Cortese, Brooklyn, NY (US); Matthew Sonier, Brooklyn, NY (US); Benoit Dion, New York, NY (US); John Foley, New York, NY (US); Yu Feng, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 46 days.

(21) Appl. No.: 16/220,607

(22) Filed: Dec. 14, 2018

(65) Prior Publication Data

US 2019/0184234 A1    Jun. 20, 2019

Related U.S. Application Data

(60) Provisional application No. 62/598,997, filed on Dec. 14, 2017.

(51) Int. Cl.
*A63B 24/00* (2006.01)
*A63B 71/06* (2006.01)
(Continued)

(52) U.S. Cl.
CPC ...... *A63B 24/0075* (2013.01); *A63B 24/0062* (2013.01); *A63B 24/0087* (2013.01);
(Continued)

(58) Field of Classification Search
CPC ............ A63B 24/0087; A63B 24/0062; A63B 71/0622; A63B 2225/50; A63B 2220/30;
(Continued)

(56) References Cited

U.S. PATENT DOCUMENTS 3,976,192 A    8/1976   Muller
4,614,337 A    9/1986   Schonenberger
(Continued)

FOREIGN PATENT DOCUMENTS

EP    0919259        6/1999
WO    WO199741925    11/1997
WO    WO2005087323   9/2005

OTHER PUBLICATIONS

PCT Search Report and Written Opinion dated Apr. 19, 2019, for PCT Application No. PCT/US2018/065706, 15 pages.
(Continued)

*Primary Examiner* — Andrew S Lo
(74) *Attorney, Agent, or Firm* — Lee & Hayes, P.C.

(57) ABSTRACT

A method includes receiving, with a processor in communication with a first exercise machine, a first request for an exercise class, the first request being provided by a first user of the first exercise machine. The method also includes providing a video file associated with the exercise class to the first exercise machine, providing a notification to a second user indicating that the first user has chosen to participate in the exercise class, and receiving a second request for the exercise class provided by the second user. The method further includes providing the video file to a second exercise machine of the second user via the network. In such a method, display of the video file via a display of the second exercise machine is synchronized with display of the video file via a display of the first exercise machine.

10 Claims, 8 Drawing Sheets

(51) Int. Cl.
*G06F 3/0482* (2013.01)
*A63B 22/02* (2006.01)
*A63B 22/00* (2006.01)
*A63B 22/06* (2006.01)

(52) U.S. Cl.
CPC ........ *A63B 71/0622* (2013.01); *G06F 3/0482* (2013.01); *A63B 22/0076* (2013.01); *A63B 22/025* (2015.10); *A63B 22/0605* (2013.01); *A63B 22/0664* (2013.01); *A63B 2024/0009* (2013.01); *A63B 2024/0012* (2013.01); *A63B 2024/0065* (2013.01); *A63B 2024/0081* (2013.01); *A63B 2024/0093* (2013.01); *A63B 2071/0625* (2013.01); *A63B 2071/0638* (2013.01); *A63B 2220/17* (2013.01); *A63B 2220/30* (2013.01); *A63B 2220/50* (2013.01); *A63B 2220/62* (2013.01); *A63B 2225/20* (2013.01); *A63B 2225/50* (2013.01); *A63B 2230/75* (2013.01)

(58) Field of Classification Search
CPC ............ A63B 2220/17; A63B 22/0076; A63B 2220/50; A63B 2225/20; A63B 2024/0009; A63B 2024/0093; A63B 22/0664; A63B 2220/62; A63B 22/0605; A63B 2024/0012; A63B 2024/0065; A63B 2024/0081; A63B 2071/0638; A63B 22/025; A63B 2230/75; A63B 2071/0625; A63B 24/0075–0087; A63B 2024/0078–0096; G06F 3/0482
See application file for complete search history.

(56) References Cited

U.S. PATENT DOCUMENTS

| | | | |
|---|---|---|---|
| D303,414 S | 9/1989 | Armstrong et al. | |
| D330,399 S | 10/1992 | Furline | |
| 5,178,594 A | 1/1993 | Wu | |
| 5,336,145 A | 8/1994 | Keiser | |
| 5,441,468 A | 8/1995 | Deckers et al. | |
| 5,458,548 A | 10/1995 | Crossing et al. | |
| 5,547,439 A | 8/1996 | Rawls et al. | |
| 5,656,000 A | 8/1997 | Russell | |
| 5,947,868 A | 9/1999 | Dugan | |
| 5,984,838 A | 11/1999 | Wang et al. | |
| 5,989,161 A | 11/1999 | Wang et al. | |
| 6,042,514 A | 3/2000 | Abelbeck | |
| 6,050,924 A | 4/2000 | Shea | |
| 6,171,218 B1 | 1/2001 | Shea | |
| 6,231,482 B1 | 5/2001 | Thompson | |
| 6,409,633 B1 | 6/2002 | Abelbeck | |
| 6,601,016 B1 | 7/2003 | Brown et al. | |
| 6,648,798 B2 | 11/2003 | Yoo | |
| 6,702,719 B1 | 3/2004 | Brown et al. | |
| 6,749,536 B1 | 6/2004 | Cuskaden et al. | |
| 6,764,430 B1 | 7/2004 | Fencel | |
| 6,830,541 B2 | 12/2004 | Wu | |
| 6,899,659 B2 | 5/2005 | Anderson et al. | |
| 6,902,513 B1 | 6/2005 | McClure | |
| 6,997,853 B1 | 2/2006 | Cuskaden et al. | |
| 7,153,241 B2 | 12/2006 | Wang | |
| 7,166,062 B1* | 1/2007 | Watterson ........... | A63B 24/0087 482/8 |
| 7,252,624 B2 | 8/2007 | Wu et al. | |
| 7,455,620 B2 | 11/2008 | Frykman et al. | |
| 7,562,761 B2 | 7/2009 | Tasma et al. | |
| 7,594,878 B1 | 9/2009 | Joannou | |
| 7,618,352 B1 | 11/2009 | Wei | |
| D606,599 S | 12/2009 | Murray et al. | |
| 8,012,067 B2 | 9/2011 | Joannou | |
| 8,348,813 B2 | 1/2013 | Huang | |
| 8,608,624 B2 | 12/2013 | Shabodyash et al. | |
| 8,829,376 B2 | 9/2014 | Wei | |
| 8,986,169 B2 | 3/2015 | Bayerlein et al. | |
| 9,174,085 B2 | 11/2015 | Foley et al. | |
| 9,254,411 B1 | 2/2016 | Chang | |
| 9,452,314 B2 | 9/2016 | Hou | |
| 9,463,349 B1 | 10/2016 | Chang | |
| 9,579,544 B2 | 2/2017 | Watterson | |
| 9,616,278 B2 | 4/2017 | Olson | |
| 9,636,567 B2 | 5/2017 | Brammer et al. | |
| 9,649,528 B2 | 5/2017 | Hou | |
| 9,675,839 B2 | 6/2017 | Dalebout et al. | |
| 9,682,307 B2 | 6/2017 | Dalebout | |
| 9,694,234 B2 | 7/2017 | Dalebout et al. | |
| 9,694,242 B2 | 7/2017 | Ashby et al. | |
| 9,713,742 B2 | 7/2017 | Pasini et al. | |
| 9,767,785 B2 | 9/2017 | Ashby et al. | |
| 9,808,672 B2 | 11/2017 | Dalebout | |
| 9,814,929 B2 | 11/2017 | Moser | |
| 9,814,930 B2 | 11/2017 | Manzke et al. | |
| 9,861,855 B2* | 1/2018 | Foley ..................... | A63B 22/06 |
| 10,022,590 B2* | 7/2018 | Foley ..................... | G06F 19/00 |
| 10,322,315 B2* | 6/2019 | Foley ..................... | G16H 15/00 |
| 10,486,026 B2* | 11/2019 | Foley ..................... | G16H 15/00 |
| 10,639,521 B2* | 5/2020 | Foley .................... | A63B 24/0062 |
| 2002/0091627 A9 | 7/2002 | Yang | |
| 2005/0054490 A1 | 3/2005 | Chou | |
| 2006/0205566 A1 | 9/2006 | Watterson et al. | |
| 2007/0072743 A1 | 3/2007 | Severino et al. | |
| 2007/0281831 A1 | 12/2007 | Wang | |
| 2009/0011907 A1 | 1/2009 | Radow et al. | |
| 2011/0319229 A1 | 12/2011 | Corbalis et al. | |
| 2012/0088633 A1 | 4/2012 | Crafton | |
| 2013/0135115 A1 | 5/2013 | Johnson et al. | |
| 2013/0281241 A1 | 10/2013 | Watterson et al. | |
| 2014/0082526 A1 | 3/2014 | Park et al. | |
| 2014/0111597 A1 | 4/2014 | Anderson et al. | |
| 2016/0023045 A1 | 1/2016 | Dalebout | |
| 2016/0023049 A1 | 1/2016 | Dalebout | |
| 2016/0103970 A1 | 4/2016 | Liu et al. | |
| 2016/0166877 A1 | 6/2016 | Cei et al. | |
| 2016/0199695 A1 | 7/2016 | Armstrong | |
| 2017/0326411 A1 | 11/2017 | Watterson | |
| 2017/0340917 A1 | 11/2017 | Chang | |
| 2018/0056132 A1 | 3/2018 | Foley et al. | |
| 2018/0126248 A1 | 5/2018 | Dion et al. | |
| 2018/0126249 A1 | 5/2018 | Consiglio et al. | |
| 2018/0264347 A1* | 9/2018 | Tran ..................... | G06F 3/00 |
| 2019/0034469 A1* | 1/2019 | Sultan ................. | A63B 24/0062 |
| 2019/0046836 A1* | 2/2019 | Starkey ................ | G01S 17/50 |
| 2019/0111318 A1* | 4/2019 | Evancha ............. | A63B 71/0622 |
| 2019/0143194 A1* | 5/2019 | Evancha ............. | A63B 24/0075 482/4 |
| 2019/0240539 A1* | 8/2019 | Perlman ............. | H04N 21/4825 |
| 2019/0336827 A1* | 11/2019 | Intonato ............. | A63B 71/0622 |
| 2019/0351283 A1* | 11/2019 | Smith ................. | A63B 22/0076 |
| 2020/0016457 A1* | 1/2020 | Ben-Chanoch ........ | G16H 20/30 |

OTHER PUBLICATIONS

"CompuTrainer", Racermate, 2017, retrieved Nov. 30, 2018 from <<http://www.racermateinc.com/computrainer/>>, 1 page.
"Netathlon", WebRacing, 2014, retrieved Nov. 30, 2018 from <<http://webracinginc.com/products_netathlon.htm>>, 3 pages.
PCT Search Report and Written Opinion dated Dec. 13, 2017, for PCT Application No. PCT/US2017/48650, 14 pages.

* cited by examiner

COORDINATING WORKOUTS ACROSS REMOTE EXERCISE MACHINES

CROSS-REFERENCE TO RELATED APPLICATION

This application is a nonprovisional application of U.S. Provisional Application No. 62/598,997, filed on Dec. 14, 2017, the entire disclosure of which is incorporated herein by reference.

FIELD OF THE INVENTION

This application relates generally to the field of exercise machines and methods associated therewith. In particular, this application relates to an exercise system and method configured to provide streaming and on-demand exercise classes to one or more users.

BACKGROUND

Humans are competitive by nature, striving to improve their performance both as compared to their own prior efforts and as compared to others. Humans are also drawn to games and other diversions, such that even tasks that a person may find difficult or annoying can become appealing if different gaming elements are introduced. Existing home and gym-based exercise systems and methods frequently lack key features that allow participants to compete with each other, converse with each other, and that gamify exercise activities.

While some existing exercise machines incorporate diversions such as video displays that present content or performance data to the user while they exercise, these systems lack the ability to truly engage the user in a competitive or gaming scenario that improves both the user's experience and performance. Such systems also lack the ability to facilitate real-time sharing of information, conversation, data, and/or other content between users, as well as between an instructor and one or more users.

To improve the experience and provide a more engaging environment, gyms offer exercise classes such as aerobics classes, yoga classes, spin classes, or other classes in which an instructor leads participants in a variety of exercises. Such class-based experiences, however, are accessible only at specific times and locations. As a result, they are unavailable to many potential participants, generally are very expensive, and often sell-out so that even potential participants in a location convenient to the gym cannot reserve a class.

Further, it is understood that the travel associated with such gym-based exercise classes can also have unintended negative environmental and/or societal impacts. For instance, participants must travel to and from the gym to participate in such exercise classes, and such travel can increase local traffic and/or can tax public modes of transportation. Such increased traffic can be a nuisance, particularly in urban areas where the population density is relatively high. Further, the elevated exhaust emissions and resource usage (gasoline, diesel fuel, natural gas, electricity, etc.) associated with such increased traffic levels can be harmful to the environment. Additionally, the time associated with traveling to and from the gym to participate in the exercise classes described above, and/or the distance between, for example, the participant's home and the gym, can be a deterrent for some potential participants who might otherwise participate in such classes. Time is a precious resource for exercise class participants, and over the course of weeks or months, the total commuting time for participants of gym-based exercise classes can add up to a significant amount of wasted/lost time.

Example embodiments of the present disclosure address the environmental, societal, and other problems described above by providing home-based exercise machines that facilitate live streaming of instructional content (e.g., exercise classes or other workouts), streaming of archived instructional content, socially networked audio and video chat, networked performance metrics, competition capabilities, and a range of gamification features. As a result of the various example embodiments described herein, traffic and/or public transportation usage may be reduced, thereby resulting in a corresponding reduction in exhaust emissions, resource usage, and other negative environmental impacts. Additionally, since the lost commuting time associated with traveling to and from the gym is eliminated by the example home-based exercise machines and exercise systems of the present disclosure, the disclosed exercise machines and/or exercise systems may improve the quality of life of users by enabling such users to re-gain such lost/wasted commuting time.

SUMMARY OF THE INVENTION

In an example embodiment of the present disclosure, a method includes receiving an instruction to begin a video stream of an exercise routine, such as an exercise class or workout, by a first user at a first exercise machine. The method may also include beginning playback at the first exercise machine and providing a notification to other users, such as users associated with the first user, that the workout has commenced. According to aspects of the method, the notified other users (e.g., one or more second users) may indicate their desire to workout, on their respective exercise machine, with the first user. Based on their desire to join, the second user(s) may be provided with a video playback that is substantially identical to the playback displayed to the first user at the first exercise machine. In some implementations, the first user may be notified that other users are joining her and/or the other users may be provided with information about the first user.

For example, some implementations of this disclosure, once second users are joined to participate in an exercise class, e.g., a pre-recorded class, the exercise machines use by the second users may collect information about the respective users, e.g., via sensors associated with the users, the exercise machines, and/or the user's equipment. Implementations of this disclosure also may determine one or more activity scores based at least partly on the sensor information associated with the first user and the additional users, and in such examples a processor may generate one or more user interfaces to display those scores. For example, the user interface may include a leaderboard that includes, among other things, activity scores corresponding to the first user and the additional user(s) that joined the first user. The leaderboard may be limited to all current participants of the workout, or may include scores for all users that have participated in the class. In some embodiments, users may be able to toggle or otherwise switch between a first leaderboard that includes only current participants and a second leaderboard that includes all participants for all time. Other filters may be applied to the leaderboard. In such examples, implementations of this disclosure may provide the user interface, in real time, to each of the users currently participating in the workout. In addition to seeing the leaderboard, each user may see his or her own activity scores, one or more additional performance metrics corresponding to the user's activity, and/or other information. Moreover, in implementations of this disclosure, the user interface may be updated to indicate when new participants join the workout.

In additional examples described herein, a user may be able to schedule a playback of a pre-recorded workout and invite others to join her during the playback. Once joined, performance metrics for each of the participants may be determined and compared in real time. Thus, for example, in implementations of this disclosure, the user may be able to simulate an exercise class with other users, in real time, despite the class having already taken place, and the other users being remote.

Accordingly, as will be described below, in each of the example embodiments described herein, the use of home-based and networked exercise machines may assist in reducing traffic and/or public transportation usage. As a result, the networked home-based exercise machines of the present disclosure may contribute to reducing exhaust emissions, resource usage, and other negative environmental impacts associated with automobiles and other traditional modes of transportation. Additionally, since the example home-based networked exercise machines of the present disclosure eliminate the need for users to travel to a gym in order to participate in an exercise class, lost commuting time is eliminated, and users are left with more time in their day. Accordingly, the quality of life of such users is significantly improved.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
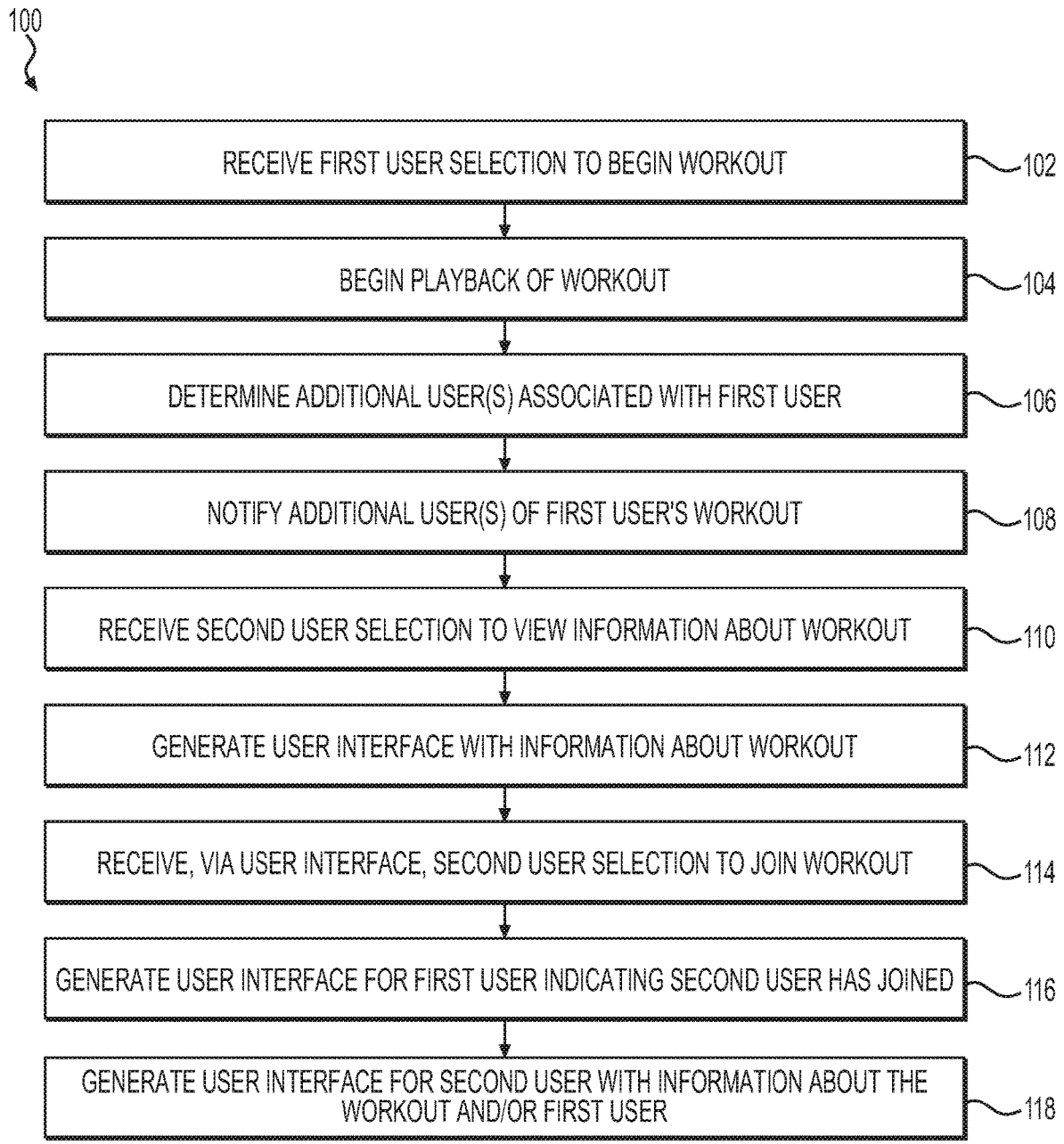
FIG. 1 illustrates a flow chart corresponding to an example method of the present disclosure.

The following description is presented to enable any person skilled in the art to make and use aspects of the example embodiments described herein. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the present disclosure. Thus, the present disclosure is not intended to be limited to the embodiments shown, but is to be accorded the widest possible scope consistent with the principles and features disclosed herein.

Example embodiments of the present disclosure include networked exercise systems and methods whereby one or more home-based networked exercise machines, such as treadmills, rowing machines, stationary bicycles, elliptical trainers, or any other suitable exercise machine, may be equipped with an associated local system that allows a user to fully participate in live instructor-led or recorded exercise classes from any location that can access a suitable communications network. The networked exercise systems, exercise machines, and methods may include backend systems with equipment including without limitation servers, digital storage systems, and other hardware as well as software to manage all processing, communications, database, and other functions. The networked exercise systems, exercise machines, and methods may also include one or more studio or other recording locations with cameras, microphones, and audio and/or visual outputs where one or more instructors can lead exercise classes and in some embodiments where live exercise classes can be conducted, and where such live and previously-recorded classes can be distributed via the communications network. In various embodiments, there may be a plurality of recording locations that can interact with each other and/or with any number of individual users.

In various embodiments, the example exercise systems and exercise machines described herein provide for full interactivity in all directions. Whether remote or in the same location, instructors may be able to interact with users, users may be able to interact with instructors, and users may be able to interact with other users. Through the disclosed networked exercise systems and exercise machines, instructors may be able to solicit feedback from users, and users may be able to provide feedback to the instructor, vote or express opinions on different choices or options, and communicate regarding their experience. Such example exercise systems and exercise machines allow for interaction through all media, including one or more video channels, audio including voice and/or music, and data including a complete range of performance data, vital statistics, chat, voice, and text-based and other communications.

In various embodiments, the exercise systems and home-based networked exercise machines described herein also allow an unlimited number of remote users to view and participate in the same live or recorded content simultaneously, and in various embodiments remote users may be able to interact with some or all of the other users viewing same content. Remote users can participate in live exercise classes offered from any available remote recording location, or they can access previously recorded classes archived in the system database. In various embodiments, a plurality of remote users can simultaneously access the same recorded class and interact with each other in real time, or they can access the same recorded class at different times and share data and communications about their performance or other topics.

Thus, the networked exercise systems and exercise machines, and the corresponding methods described herein, provide for content creation, content management and distribution, and content consumption. Various aspects of such exercise systems and exercise machines, user interfaces that may be provided to users via such machines, and the potential interactions between such machines, will now be described in more detail.

Exercise Machine

Although not illustrated in the figures filed herewith, in various example embodiments of the present disclosure, a local system may include a home-based networked exercise machine such as a stationary bicycle, a treadmill, an elliptical machine, a rower, or other exercise machine with integrated or connected digital hardware including one or more displays (e.g., a touch screen display, an LCD, etc.) for use in connection with an instructor lead exercise class and/or for displaying other digital content. For ease of description, the exercise machine may be described and/or otherwise referred to herein as a "treadmill," a "stationary bicycle," or a "cycle." However, as noted above, example exercise machines of the present disclosure may be any suitable type of exercise machine, including a rowing machine, elliptical trainer, stair climber, etc.

In various example embodiments, the one or more displays may be mounted directly to the exercise machine or otherwise placed within view of a user. In various exemplary embodiments, the one or more displays allow the user to view content relating to a selected exercise class both while working out on the exercise machine and while working out in one or more locations near or adjacent to the exercise machine.

Additionally, digital hardware associated with the exercise machine may be connected to or integrated with the exercise machine, or it may be located remotely and wired or wirelessly connected to the exercise machine. Such digital hardware may include digital storage (e.g., memory), one or more processors or other like computers or controllers, communications hardware, software, and/or one or more media input/output devices such as displays, cameras, microphones, keyboards, touchscreens, headsets, and/or audio speakers. In various exemplary embodiments, these components may be connected to and/or otherwise integrated with the exercise machine. All communications between and among such components of the digital hardware may be multichannel, multi-directional, and wireless or wired, using any appropriate protocol or technology. In various exemplary embodiments, the digital hardware of the exercise machine may include associated mobile and web-based application programs that provide access to account, performance, and other relevant information to users from local or remote exercise machines, processors, controllers, personal computers, laptops, mobile devices, or any other digital device or digital hardware. In any of the examples described herein, the one or more controllers, processors, and/or other digital hardware associated with the exercise machine may be operable to perform one or more functions associated with control logic of the exercise machine. Such control logic may comprise one or more rules, programs, or other instructions stored in a memory of the digital hardware. For example, one or more processors included in the digital hardware may be programmed to perform operations in accordance with rules, programs, or other instructions of the control logic, and such processors may also be programmed to perform one or more additional operations in accordance with and/or at least partly in response to input received via one or controls of the exercise machine, via the display, and/or via one or more sensors of the exercise machine.

For example, in some embodiments the exercise machine may include one or more sensors configured to sense, detect, measure, and/or otherwise determine various performance metrics from both the exercise machine and the user, instantaneously and/or over time. For example, the exercise machine may include one or more sensors that measure a rotational speed of a flywheel, motor, track, belt, pedals, and/or other rotational components of the exercise machine. One or more such sensors may also measure a load or force applied to the one or more such components by the user. Such sensors may also measure and/or otherwise determine an amount of energy expended by the user, a power output of the exercise machine, a corresponding power output of the user, user weight, steps, distance, total work, repetitions, an amount of resistance applied to the motor or flywheel of the exercise machine, as well as any other suitable performance metric associated with, for example, a stationary bicycle or a treadmill. The exercise machine may also include sensors to measure user heart-rate, respiration, hydration, calorie burn, or any other physical performance metrics, or to receive such data from sensors provided by the user. Where appropriate, such performance metrics can be calculated as current/instantaneous values, maximum, minimum, average, or total over time, or using any other statistical analysis. Trends can also be determined, stored, and displayed to the user, the instructor, and/or other users. Such sensors may communicate with memory and/or processors of the digital hardware associated with the exercise machine, nearby, or at a remote location, using wired or wireless connections.

Display and User Interface

One or more displays connected to and/or otherwise associated with the exercise machine may be driven by a user input device such as a touchscreen, mouse, voice control, or other suitable input device. In some examples, the display or at least a portion thereof, may comprise a touchscreen configured to receive touch input from the user. The one or more displays may be any size, but optimally are large enough and oriented to allow the display of a range of information including one or more video streams, a range of performance metrics corresponding to the user, a range of additional performance metrics associated with one or more additional users exercising on exercise machines remote from the exercise machine, and a range of different controls.

In various exemplary embodiments, the user can use the display or one or more user interfaces displayed on the display to selectively present a range of different information including live and/or archived video, performance data, and other user and system information. As will be described below, such user interfaces can provide a wide range of control and informational windows that can be accessed and removed individually and/or as a group by a click, touch, voice command, or gesture. In various exemplary embodiments, such windows may provide information about the user's own performance and/or the performance of other participants in the same class both past and present.

Example user interfaces presented via the display may be used to access member information, login and logout of the system, access live content such as live exercise classes and archived classes or other content. User information may be displayed in a variety of formats and may include historical and current performance and account information, social networking links and information, achievements, etc. The user interfaces described herein can also be used to access the system to update profile or member information, manage account settings such as information sharing, and control device settings.

An example user interface may also be presented on the one or more displays to allow users to manage their experience, including selecting information to be displayed and arranging how such information is displayed on the display. Such a user interface may present multiple types of information overlaid such that different types of information can be selected or deselected easily by the user. For example, performance metrics and/or other information may be displayed over video content using translucent or partially transparent elements so the video behind the information elements can be seen together with (i.e., simultaneously with) the performance metrics and/or other information itself. Further, example user interfaces may present a variety of screens to the user which the user can move among quickly using the provided user input device, including by touching if a touchscreen is used.

In any of the examples described herein, the processor and/or other components of the digital hardware may control the display and/or otherwise cause the display to display the various user interfaces of the present disclosure. For example, the processor or other components of the digital hardware may cause the display to display a user interface comprising a home screen that provides basic information about the system and/or the exercise machine, as well as available options. Such a home screen may provide direct links to information such as scheduled classes, archived classes, a leaderboard, instructors, and/or profile and account information. The home screen may also provide direct links to content such as a link to join a particular class. The user can navigate among the different portions of the home screen by selecting such links using the applicable input device such as by touching the touchscreen at the indicated location, or by swiping to display a new screen. An example user interface providing such a home screen may also provide other information relevant to the user such as social network information, and navigation buttons that allow the user to move quickly among the different screens in the user interface.

In various example embodiments, a processor of the present disclosure may be programmed and/or otherwise configured to generate and provide various user interfaces to a plurality of users such that the users may participate in live or archived workouts using the exercise machine. FIG. 1 illustrates a flow chart illustrative of an example method 100 of the present disclosure in which a processor (either a remote processor or a processor local to one or more of the exercise machines) generates and provides such user interfaces. For example, at 102 the processor may receive an input (e.g., a user selection), from a first user, to begin a workout. For example, the user may select a live or prerecorded workout from a list, array, or other arrangement of indications of available workouts displayed on a display associated with the first user's exercise machine. In some examples, the processor may be associated with or otherwise configured to access one or more databases to retrieve a digital recording of a workout, such as an exercise class. In some embodiments, the one or more databases may comprise remote databases, e.g., remote from the first user. For example, the one or more databases may be associated with servers at a production facility or other centralized locale. In other implementations, the database(s) may be embodied as cloud or remote server storage. In still further embodiments, the database(s) may be local to the user, e.g., embodied as a memory associated with the user's exercise machine. In any of the examples described herein, at 102 the method 100 may include, receiving, with a processor in communication with a first exercise machine, a first request for an exercise class, and in such examples, the request may be provided by a first user of the first exercise machine. In some examples, such a request may be included in one or more signals provided by the first exercise machine, to the processor (e.g., a remote processor), via a network.

At 104, in response to receiving the user section to begin the workout, the processor may cause the requested workout to begin. For example, the processor may cause video content and/or audio content to be presented to the first user, e.g., via a speaker and/or video display associated with the first user's exercise machine. For instance, the processor may facilitate streaming of, and/or may otherwise provide, a digital video file comprising video content and/or audio content of the workout to the first user over a network such as a wired or wireless network. Moreover, in some instances, the processor may cause a change to be effected at the exercise machine (e.g., to prepare the exercise machine for the workout). In some instances, for example, the processor may cause a change in one or more of an incline, a resistance, a belt speed, or the like, depending on the type of equipment and the requirements of the selected workout. Although 104 contemplates starting the workout, in other implementations, some interval of time may be provided before the workout actually commences. For example, the interval may allow others to join prior to the user starting and/or may provide for a warm-up or other preparation time. In any of the examples described herein, at 104 the method 100 may include, providing a video file comprising audio content and video content associated with the exercise class to the first exercise machine of the first user, and via the network.

At 106, the processor may determine one or more additional users associated with the first user. For example, one or more databases associated with the exercise system may include user associations that group or otherwise relate users. For instance, the first user may have "friended" or otherwise created a mutual association with one or more additional users. In other embodiments, the association may be a unilateral association (e.g., the one or more additional users follow the first user, or the first user follows the one or more additional users). In other implementations, the associations may be determined based on one or more characteristics of the first user and/or the one or more additional users. For instance, users may be associated based on common membership to a group, based on shared demographic (e.g., age, gender, ethnicity, etc.) or preference information, based on location, and/or based on other factors.

Figure 2:
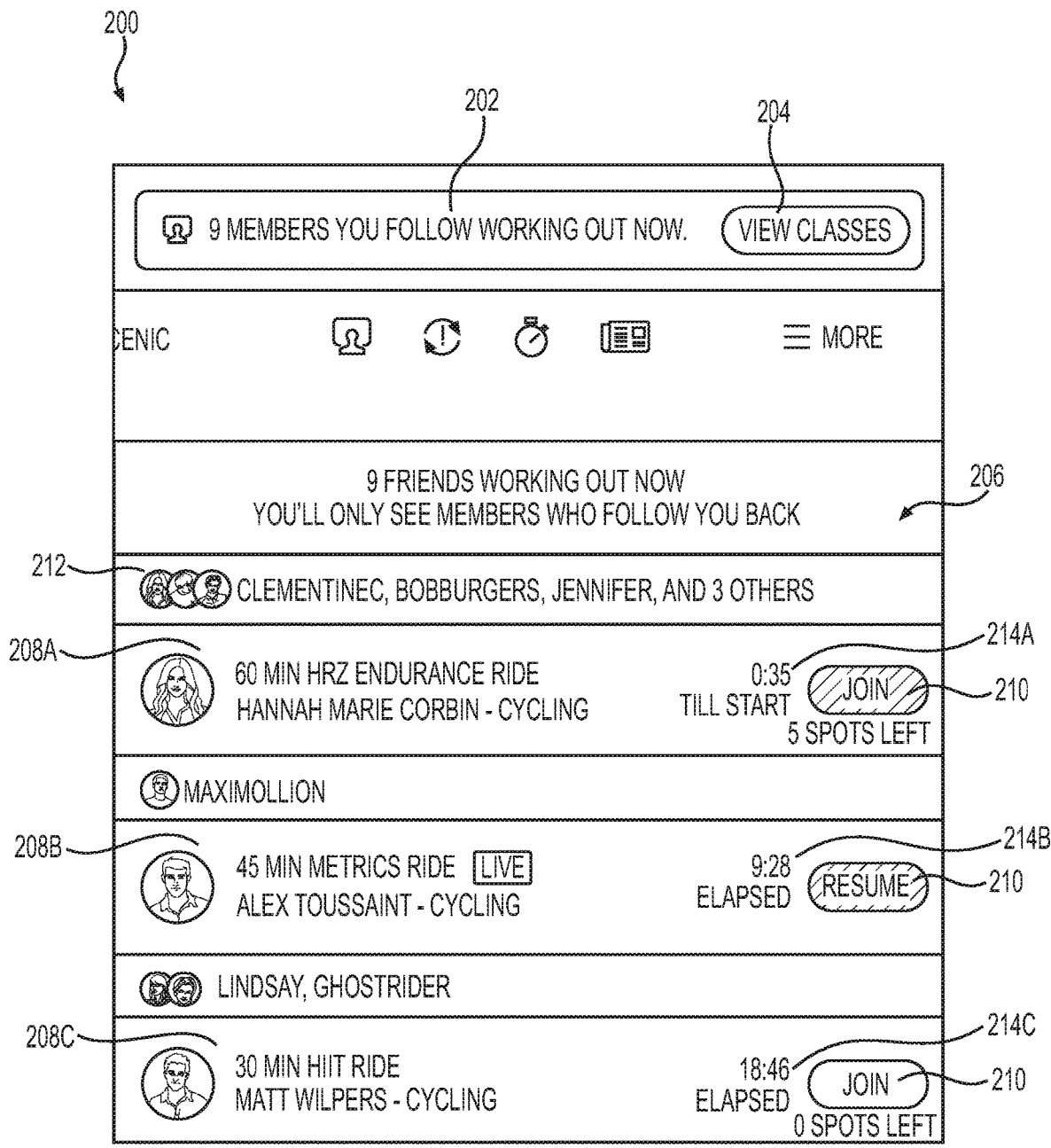
FIG. 2 illustrates an example user interface of the present disclosure. Aspects of the user interface shown in FIG. 2 may correspond to the method described herein with respect to FIG. 1.

At 108, the processor may notify the one or more additional users determined at 106 that the first user has chosen to participate in the exercise class and/or that the first user has commenced her workout. This notification may be done via conventional messaging (e.g., email, SMS, or push notification). For example, at 108 the processor may generate a notification signal and send the signal to respective processor of one or more additional exercise machines. In some implementations, the notification may be provided only to the respective exercise machines of the additional users or only to the exercise machines of users that are currently active on their respective equipment. For example, FIG. 2 illustrates an example user interface 200 in which a pop-up window 202 or other graphical or textual convention is used to convey to the additional user(s) that the first user is working out. In implementations of this disclosure, the user interface 200 is displayed on a display associated with each of the additional user's exercise machine. In any of the examples described herein, at 108 the method 100 may include providing a signal and/or other notification to a second user via the network. In such examples, the notification may indicate that the first user has chosen to participate in a particular exercise class. Such a notification may be provided to the second user via a second exercise machine of the second user and/or via a mobile device of the second user, via email, etc.

At 110, the processor may receive a second user request, a second user selection, or other such input to view information about the workout. For instance, in embodiments of this disclosure, the second user may be one of the additional users, and the selection to view the information about the workout may correspond to a user selection of an interactive control on a displayed user interface. By way of non-limiting example, the user interface 200 includes an interactive control 204, the selection of which generates a signal to provide the user with information about the workout.

At 112, the processor generates a user interface with information about the workout. More specifically, at 112, the processor generates a user interface that is responsive to the selection at 110. Again, with reference to the example interface 200 illustrated in FIG. 2, a list 206 may include graphical representations 208*a*, 208*b*, 208*c* of each workout currently being undertaken by other associated users.

At 114, the processor may receive a selection from one or more additional users (e.g., a second user) to join the workout. For instance, one of the second users may decide to join the first user in her workout and indicate this decision by selecting or otherwise interacting with the second user's display. In the example user interface 200 illustrated in FIG. 2, for example, the second user, when presented with the user interface 200, may opt to join in the first-listed workout by selecting a "join" control 210 associated with the graphical representation 208*a* for that workout. In any of the examples described herein, at 114 the method 100 may include, receiving, with the processor and via the network, a second request for the exercise class. In such examples, the second request may comprise one or more signals or inputs provided by the second user via the second exercise machine of the second user and/or via a mobile device of the second user, via email, etc.

At 116, the processor may generate a user interface for the first user indicating the second user has joined. For instance, a notification or other message may be presented to the first user on a display associated with the first user's exercise machine, indicating that the second user has joined the workout. For instance, as described below with reference to FIG. 4B, new users that join the workout may be displayed on a portion of a user interface, such as in conjunction with a leaderboard. Similarly, at 118, the processor may generate a user interface for the second user with information about the first user. For instance, the second user may be notified that he has successfully joined the first user's workout. Moreover, performance data for the first and second users may be shared therebetween, as well as with other users partaking of the workout. In addition, the association of the two users with the workout may trigger the processors to provide communication between the first user in the second user. For example, the users may be provided with text-based messaging capabilities on the respective screens. In other embodiments, the first user may be provided with a video stream of the second user and/or the second user may be provided with a video stream of the first user.

According to the method described above with respect to FIG. 1, aspects of this disclosure may allow users to work out with friends, even when the users are in geographically diverse locations. Moreover, because the users may be working out together using a prerecorded workout video, the users may have more flexibility to coordinate their workouts when compared to scenarios in which the users are coordinating relative to live exercise classes. In some implementations, a user may be able to find someone with whom to workout regardless of time of day or location.

As noted above, FIG. 2 illustrates a user interface 200 via which a user may join one or more friends or acquaintances in a workout. As briefly described above, the user interface 200 includes the pop-up window 202, which may be any messaging-type information box or window that indicates to the user that one or more associated/additional users are working out. The pop-up window 202 also includes the selectable control 204, which allows the user to see the workouts currently being undertaken. In other embodiments, the workouts may be automatically shown to the user, such that the selectable control 204 may not be necessary. Other modifications also contemplated and will be appreciated by those having ordinary skill in the art with the benefit of this disclosure. The user interface 200 also includes (or includes after selection of the control 204) the list 206 of workouts, the graphical representations 208*a*, 208*b*, 208*c*, associated with the workouts, and the controls 210 for joining the workouts. Users currently taking part in the workouts may also be displayed, such as by representations 212.

As also illustrated in FIG. 2, the control 210 for joining the workout may be different depending on a state of the workout. For example, a first workout, associated with the first representation 208*a* has not yet started, and the associated control 210 allows a user to "join" the workout. In this context, joining the workout by selecting the control 210 may prompt the processor to display a countdown to the start of the workout. As also illustrated by the user interface 200, a timer 214 may be provided to inform the user of a status of the workout class, and in some embodiments, that timer 214 may be expanded until the workout starts. Alternatively, or additionally, when the workout has not yet started, instructions for warm-up or other information about the workout (e.g., additional equipment required to complete the workout, or the like) may be displayed to the user. Although the example "join" control 210 is shown in conjunction with a class that has not yet started, and the timer 214*a* shows the time until the class starts, in other embodiments, the class may have already started, in which case, the timer 214*a* may inform how much of the class has elapsed. Should the user select to join a class that is already in progress, the playback of the class may be synchronized to the playback of the users already taking the class, so all users are at the same point in the class. Thus, the experience may be similar to the user walking in late to a spinning or other class that is already in progress at a fitness center or the like. In any of the examples described herein, the method 100 may include, based at least partly on a request received from the second user, providing the video file to the second exercise machine of the second user via the network described above. In such examples, display of the video file via a display of the first exercise machine (e.g., the exercise machine of the first user) may be synchronized with display of the video file via a display of the second exercise machine (e.g., the exercise machine of the second user).

In the user interface 200, the second listed workout, associated with the graphical representation 208b, has already started. In the illustration, the processor may replace the word "join" with the word "resume." As also illustrated, by the timer 214b, the second workout has already begun. In embodiments of this disclosure, the user may already be taking the second-listed class, but may have left the playback of the class to view other classes and friends taking those classes (or the interface 200 may be displayed in conjunction with the video playback of that workout). Thus, selecting "resume" may take the user back to the video display of that second workout.

The final listed workout, associated with the graphical representation 208c, also includes a control 210 and a timer 214c, but the control 210 and the timer 214c are grayed out. In this embodiment, the graying out of the control 210 and the timer 214c indicates that the user is not capable of joining the third workout. For instance, the user may be unable to join the workout because some threshold amount of time is elapsed in the workout (e.g., more than half of the workout has elapsed), or because the number of simultaneous users may be capped. For example, under the control 210 is an indication that zero sports are left. This indication is in contrast to the indication associated with the first graphical representation 208a of the first workout, which indicates that five spots are left in the first workout.

It is understood that in any of the examples described herein, by at least one of beginning playback of the workout on a first user's exercise machine (at 102), determining additional users associated with the first user (at 106), notifying such additional users of the first user's workout (at 108), receiving a second user's selection to join the workout (at 114), generating one or more corresponding user interfaces (at 116), and/or facilitating other operations described herein, the method 100 described with respect to FIG. 1 may be useful in reducing traffic and/or public transportation usage. As a result, the networked home-based exercise machines of the present disclosure utilized in association with the method 100 may contribute to reducing exhaust emissions, resource usage, and other negative environmental impacts associated with automobiles and other traditional modes of transportation. Additionally, since the example home-based networked exercise machines utilized in association with the method 100 eliminate the need for users to travel to a gym in order to participate in the selected workout, lost commuting time is eliminated, and the users associated with the method 100 are left with more time in their day. Accordingly, the quality of life of such users may be improved.

Figure 3:
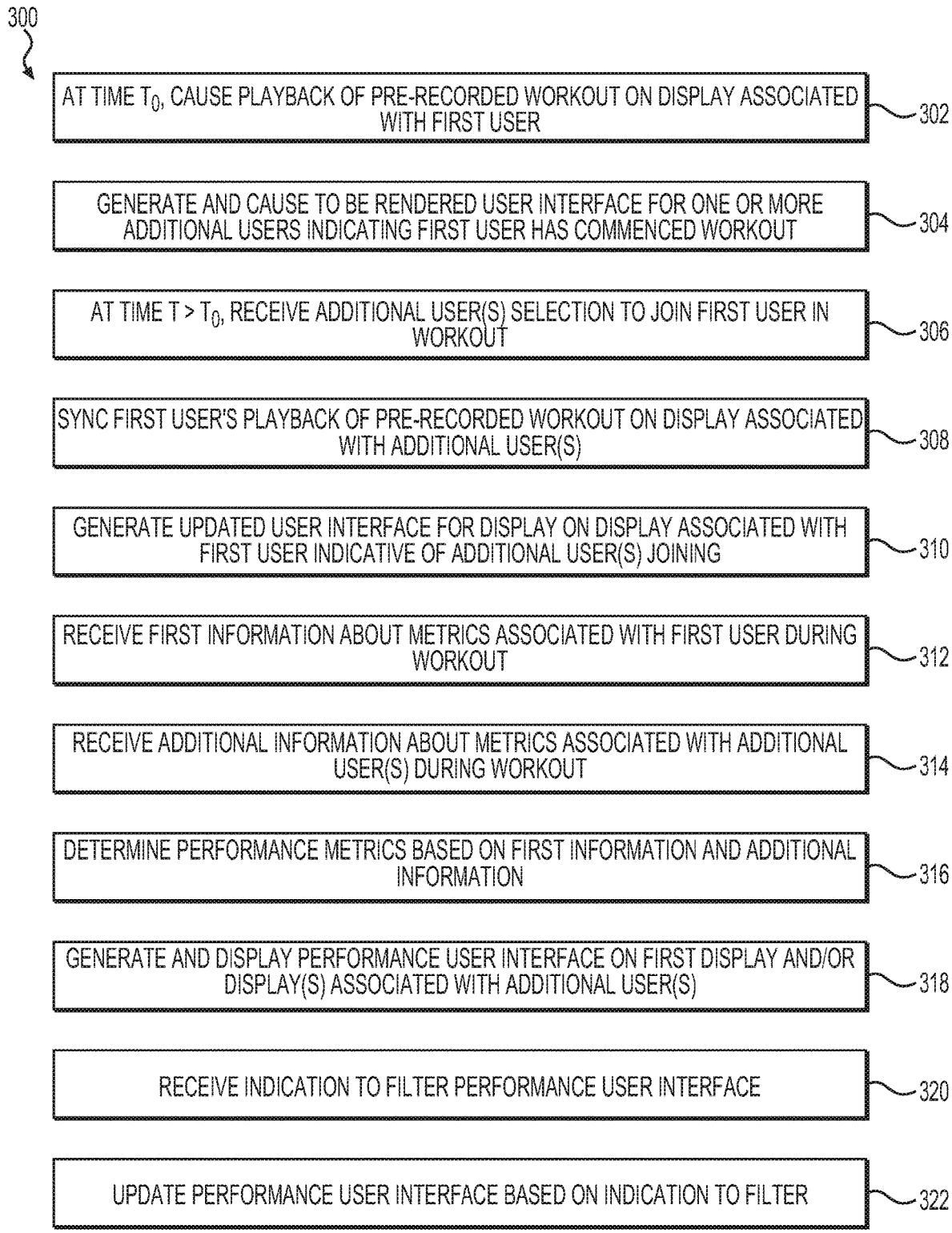
FIG. 3 illustrates a flow chart corresponding to another example method of the present disclosure.

FIG. 3 illustrates an example method 300 for creating a shared exercise experience for users of discrete exercise machine. As described above with respect to the method 100 shown in FIG. 1, in various example embodiments, a processor of the present disclosure may be programmed and/or otherwise configured to generate and provide various user interfaces to a plurality of users such that the users may participate in live or archived workouts using the exercise machine. Accordingly, such a processor (either a remote processor or a processor local to one or more of the exercise machines) may perform one or more of the operations described herein with respect to the method 300.

For example, at 302 a processor of the present disclosure may cause the playback of a prerecorded workout on a display associated with a first user at a time $T_0$. For example, a user may log into an interface associated with exercise machine and choose to have a prerecorded workout class presented on a display associated with the user's equipment.

In any of the examples described herein, at 302, the method 300 may include receiving, with a processor (e.g., a remote processor) in communication with a first exercise machine, a first request for a pre-recorded exercise class or other such workout. In such examples, at 302 the first request may be provided by a first user of the exercise machine.

At 304, the processor may generate, and cause to be rendered, a user interface for one or more additional users. This user interface indicates to other users that the first user has commenced her workout. For example, as in the process 100 described above, the additional users being presented with the user interface generated at 304 can be selected based on their association with the first user. In other embodiments, all users or some other subset of all users may be presented with the user interface indicative of the first user starting her workout. For example, the workout may be a "public" workout, open to any user. In any of the examples described herein, at 304, the method 300 may include providing (e.g., with the remote processor described above) a video file comprising audio content and video content associated with the exercise class to the first exercise machine, and via a network.

At 306, the processor may receive an additional user selection to join the first user in the workout at some time after commencement of the first user's workout. For example, one or more additional users may decide to work out with the first user, and may choose to join the first user in her workout. Steps described above with regard to FIG. 1 may be used to facilitate joining of the first user's workout, for example. In any of the examples described herein, at 306, the method 300 may include receiving, with the processor (e.g., the remote processor) and via the network, a second request for the exercise class. In such examples, at 306 the second request may be provided by the second user after the first user began participating in the exercise class or other such workout.

At 308, the processor may sync the first user's playback of the prerecorded workout on a display associated with the additional user(s) who have indicated they would like to join the first user in her workout. Accordingly, each of the users who joins the first user's workout will begin viewing the workout at the same spot at which the first user is currently viewing the workout. Thus, if an additional user joins the first user's workout when the workout is 45 seconds in progress, the additional user will not be streamed the first 45 seconds of the workout. In effect, the additional user will have missed the first 45 seconds of the workout, as if the additional user was late to the start of an exercise class. Moreover, collection of data and determination of performance metrics may commence only upon joining, such that the later joining user may be forced to "catch up" to the first user and any other users who may have joined first. In any of the examples described herein, at 308, the method 300 may include, based at least partly on the second request described above with respect to 306, providing the video file to a second exercise machine of the second user via the network.

At 310, the processor may generate an updated user interface for display on the first user's display, indicating that one or more additional users joined her workout. For example, the user who initiated the workout may be provided with a list or other graphical representation of other users joining her in her workout. FIG. 4B illustrates such a list. Moreover, as additional users join, any users already participating in the workout may be provide with a similar indication of newly joined participants.

At 312, the processor may receive first information about metrics associated with the first user during the workout. For example at 312, the processor may receive a plurality of sensor information associated with the first user. Such sensor information may include, for example, at least one of speed, incline, heart rate, distance, hydration, respiration, output, cadence, and/or any other performance metrics or other parameters described herein. It is understood that such first sensor information may be received by the processor at 312, via one or more networks, communications interfaces, mobile devices, wearable devices, monitors, and/or other devices used to connect the processor with the user's exercise machine, which may be remote from the processor. In any of the examples described herein, at 312, the method 300 may include receiving, with the processor (e.g., the remote processor) and via the network, first information from the first exercise machine. In such examples, at 312 the first information may indicate one or more performance metrics of the first user determined during performance of the exercise class.

At 314, the processor may receive additional information about metrics associated with the one or more additional users that joined the first user's workout. For example, the processor may receive a plurality of sensor information associated with the additional user(s), which may comprise the same type of sensor information as received for the first user. Such sensor information may include, for example, at least one of speed, incline, heart rate, distance, hydration, respiration, output, cadence, and/or any other performance metrics or other parameters described herein. It is understood that such additional sensor information may be received by the processor at 314, via one or more networks, communications interfaces, mobile devices, wearable devices, monitors, and/or other devices used to connect the processor with the additional user's exercise machine, which may be remote from the processor and/or the first user's machine.

At 316, the processor may determine one or more performance metrics based on at least some of the information received at 312 and/or at 314. For instance, at 316, the processor may determine a first score (e.g., a "performance metric score") for the first user based at least partly on the first sensor information received at 314. For example, the processor may use such information as respective inputs into one or more neural networks, algorithms, look-up tables, and/or other software and/or hardware components associated with the processor in order to generate a corresponding score. In such examples, the score determined at 316 may comprise a current output of the first user. For example, as noted above such user output may comprise a metric indicative of the energy expended by the particular user during the exercise class and/or other such workout. In some examples, such a user output may be calculated and/or otherwise determined based at least partly on (e.g., as a function of) one or more of a speed at which the user is peddling, a resistance value, a brake value, a pedal cadence, and/or other value indicative of a particular setting of a stationary bicycle. Alternatively, in embodiments in which the exercise machine comprises a treadmill, such a user output may be calculated and/or otherwise determined based at least partly on (e.g., as a function of) one or more of an incline of the deck, a speed of the belt, a resistance of the belt, and/or other factors.

For example, in embodiments in which the exercise machine comprises a stationary bicycle (e.g., a networked home-based stationary bicycle), the processor may utilize the following algorithm in determining the score (e.g., the performance metric score and/or any other such "output" of the first user) at 316:

$$\text{Score}_{bicycle} = (A(S) + B(R))/100,$$

wherein "S" comprises a speed (e.g., miles per hour, revolutions per minute etc.) at which the user is pedaling, "R" comprises a resistance value (e.g., pounds force, volts, amperes, ohms, etc.) associated with a magnetic brake, flywheel, or other component of the stationary bicycle, "A" comprises a first weight, factor, or other coefficient associated with the speed S at which the user is pedaling, and "B" comprises a second weight, factor, or other coefficient associated with the resistance value R. In such examples, the above algorithm ($\text{Score}_{bicycle}$) may be used alone or in combination with one or more algorithms to generate, calculate, and/or otherwise determine the score at 316. In any of the examples, described herein, the above algorithm ($\text{Score}_{bicycle}$) may include greater or fewer terms than those listed above. Additionally or alternatively, one or more look-up tables (e.g., including stored speed values, resistance values, and/or other values), neural networks, and/or other components may be employed by the processor to determine the score at 316.

In further embodiments in which the exercise machine comprises a treadmill (e.g., a networked home-based treadmill), the processor may utilize the following algorithm in determining the score (e.g., the performance metric score and/or any other such "output" of the first user) at 316:

$$\text{Score}_{treadmill} = (C(S) + D(I))/100,$$

wherein "S" comprises a speed (e.g., miles per hour, etc.) at which the user is walking, jogging, or running on a belt of the treadmill, "I" comprises an incline of a deck of the treadmill (e.g., inches, etc.), "C" comprises a first weight, factor, or other coefficient associated with the speed S at which the user is walking, jogging, or running, and "D" comprises a second weight, factor, or other coefficient associated with the incline I of the deck. In such examples, the speed S may comprise and/or may be indicative of a belt speed (e.g., revolutions per minute) associated with the belt of the treadmill. Additionally, in such examples the incline I may be measured with respect to a floor, base, and/or other support surface on which the treadmill is disposed. In any of the examples described herein, the incline I may comprise and/or may be indicative of an angle of incline (e.g., 5 degrees, 10 degrees, 15 degrees, etc.) as measured relative to such a support surface. Further, the above algorithm ($\text{Score}_{treadmill}$) may be used alone or in combination with one or more algorithms to generate, calculate, and/or otherwise determine the score at 316. In any of the examples, described herein, the above algorithm ($\text{Score}_{treadmill}$) may include greater or fewer terms than those listed above. Additionally or alternatively, one or more look-up tables (e.g., including stored speed values, resistance values, and/or other values), neural networks, and/or other components may be employed by the processor to determine the score at 316.

It is understood that the score determined at 316 may include and/or may comprise one or more additional values such as a distance travelled by the user during the workout (e.g., miles, kilometers, etc.) an average output of the user, a total output of the user, a current cadence, an average cadence, a current resistance, an average resistance, a current speed, an average speed, a number of calories burned, a current pace, an average pace over the course of the workout, a current heart rate of the user (e.g., as determined by a heart rate monitor, a wearable device, and/or by one or more sensors on the exercise machine), an amount of time spent in one or more particular heart rate zones, an average heart rate zone based at least in part on personalized heart rate zone information, an elevation climbed by the user during the workout, a measure of the user's compliance (e.g., accuracy) with instructions given by the instructor during the workout, and/or any other similar metric. For instance, in some examples the score generated at 316 may comprise an accuracy metric and/or any other metric indicating how closely the user's heart rate zone, output, power zone, resistance, speed, incline, running form, walking form, gate, seat position, or other performance metrics match those requested, suggested, commanded, or otherwise noted by the instructor during a particular exercise class or other workout participated in by the user via the exercise machine. Further, at 316, the processor may determine additional scores corresponding to each of the respective plurality of additional users participating in the exercise class and/or other workout. In any of the examples described herein, at 316, the method 300 may include generating a performance metric score of the first user based at least partly on the first information received at 312. In such examples, at 316 the performance metric score may be indicative of an amount of energy expended by the first user during performance of the exercise class.

At 318, the processor may generate, and cause to be display, a performance user interface. For example, the performance user interface may comprise a leaderboard or other comparative graphic that shows relative performance of the first user and the additional user(s). In any of the examples described herein, at 318, the method 300 may include providing the performance metric score (generated at 316) to the first exercise machine and/or to the second exercise machine via the network.

At 320, the processor may receive an indication to filter the performance user interface and at 322, the processor may update the performance user interface based on the indication to filter. This concept is best described with reference to FIG. 4a.

Figure 4A:
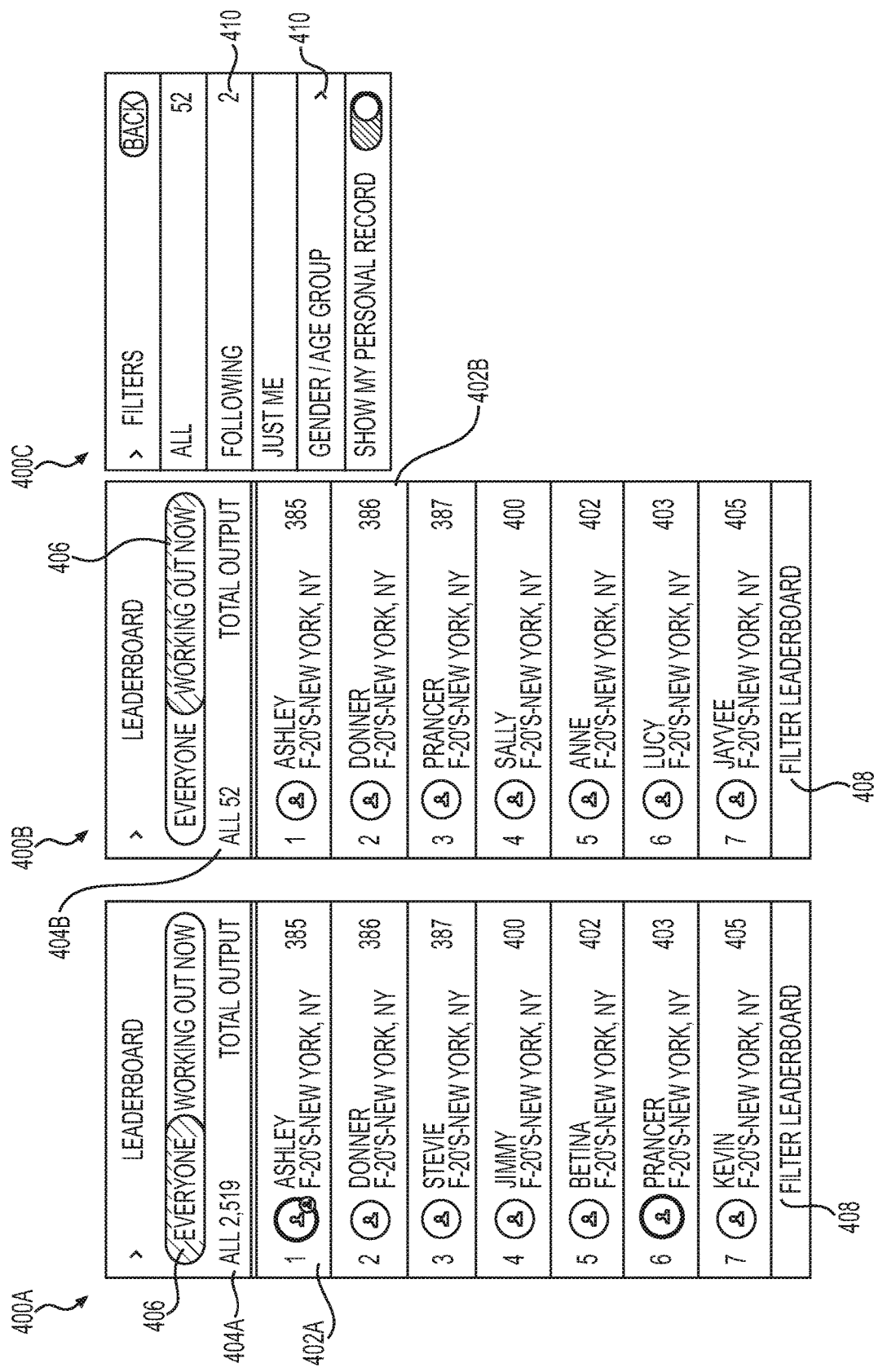
FIGS. 4A and 4B illustrate example user interfaces of the present disclosure. Aspects of the user interfaces shown in FIGS. 4A and 4B may correspond to the method described herein with respect to FIG. 3.
Figure 4B:
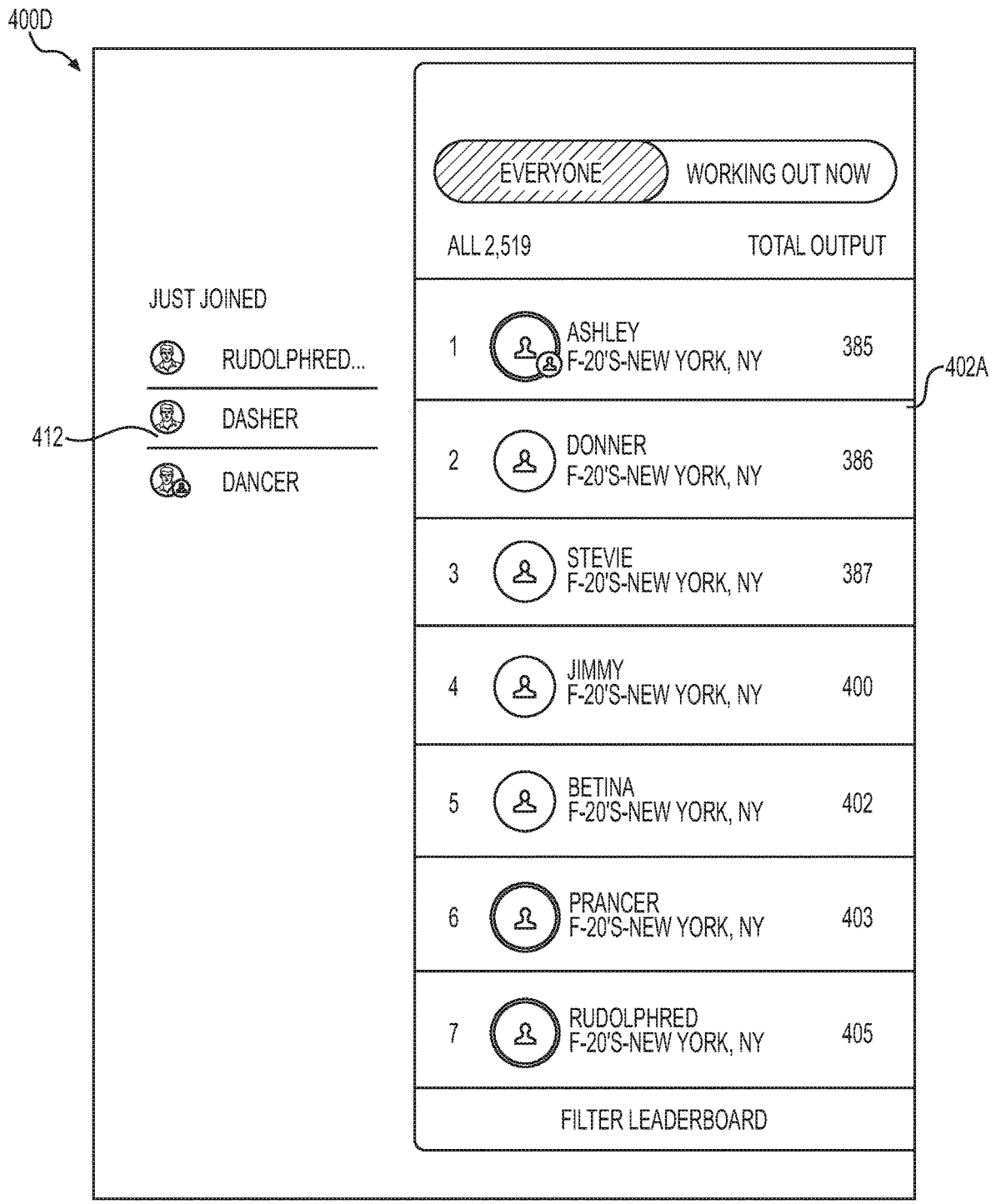

More specifically, FIG. 4a shows three example user interfaces 400a, 400b, 400c, with the user interface 400a including a leaderboard 402a and the user interface 400b including a leaderboard 402b. The leaderboards 402a, 402b may be generated at 318. The leaderboards 402a, 402b may allow each user to see their performance in comparison to others taking and/or participating in the same exercise class. In various exemplary embodiments, the leaderboards 402a may comprise a separate window overlaid on and/or otherwise displayed together with the playback of the class and/or the information elements. Inasmuch as the workout class may be a pre-recorded workout class, any number of participants may have already taken the class. Thus, 400a illustrates the leaderboard 402a as including all participants who have ever taken the class. Note that the user interface 400a indicates at 404a that 2,519 users have taken the class. The leaderboard 402a in user interface 400a will allow the first user and the additional users to see their performance relative to all other users. In contrast, the user interface 400b includes a leaderboard 402b that includes only those users that are currently working out. Note that the user interface 400b indicates at 404b that 52 users are "working out now," i.e., currently streaming the class. In this example, only the first user and the additional users that opted to join the first user are shown in the leaderboard 402b of the user interface 400b. In example implementations of this disclosure, either the leaderboard 402a or the leaderboard 402b may be the default leaderboard (e.g., displayed upon commencement of the workout), and in implementations of this disclosure, a control 406 may be provided that allows the user to choose between the two leaderboards 402a, 402b. Such a choice may be made via selection, e.g., in accordance with 320 of the process 300. For instance, the control 406 may be a graphical slider, toggle, button or other conventional control element.

As illustrated in the example user interface 400c, a user may also be provided with additional controls to filter the respective leaderboards 402a, 402b. By way of non-limiting example, a user may select the "filter leaderboard" control 408 associated with either of the leaderboards 402a, 402b and the user interface 400c may open. As illustrated, the user interface 400c may include additional controls 410 that may allow the user to otherwise alter the subgroup of participants displayed on the leaderboard. For example, the user may be able to customize the leaderboard 402a, 402b to show the performance of participants in a particular age group, male participants, female participants, male participants in a particular age group, participants in a particular geographic area, etc. Users may have the ability to individually curate and/or otherwise configure the leaderboard, or have the system curate a leaderboard by selecting an appropriate group of participants relative to the user.

The leaderboards 402a, 402b may be fully interactive, allowing the user to scroll up and down through the participant rankings, and to select a participant to access their detailed performance data, create a connection such as choosing to follow that participant, or establish direct communication such as through an audio and/or video connection. The leaderboards may also display the user's personal best performance in the same or a comparable class, to allow the user to compare their current performance to their previous personal best. The leaderboards may also highlight certain participants, such as those that the user follows, or provide other visual cues to indicate a connection or provide other information about a particular entry on the leaderboard. For example, when all (e.g., current and past) participants are shown in the leaderboard, those currently working out may be highlighted or otherwise indicated as such. In various exemplary embodiments, the leaderboard will also allow the user to view their position and performance information at all times while scrolling through the leaderboard.

Moreover, as illustrated in FIG. 4B, a user interface 400d including the leaderboard may also include additional information. Specifically, the user interface 400d includes the leaderboard 402a, as well as a listing 412 of additional users. For instance, the additional user list 412 may be populated in real time as users join the workout.

It is understood that in any of the examples described herein, by at least one of causing playback of a pre-recorded workout (at 302), generating and causing to be rendered a user interface for one or more additional users (at 304), syncing a first user's playback of the pre-recorded workout on respective displays associated with one or more additional users (at 308), and/or facilitating other operations described herein, the method 300 described with respect to FIG. 3 may be useful in reducing traffic and/or public transportation usage. As a result, the networked home-based exercise machines of the present disclosure utilized in association with the method 300 may contribute to reducing exhaust emissions, resource usage, and other negative environmental impacts associated with automobiles and other traditional modes of transportation. Additionally, since the example home-based networked exercise machines utilized in association with the method 300 eliminate the need for users to travel to a gym in order to participate in the selected workout, lost commuting time is eliminated, and the users associated with the method 300 are left with more time in their day. Accordingly, the quality of life of such users may be improved.

Figure 5:
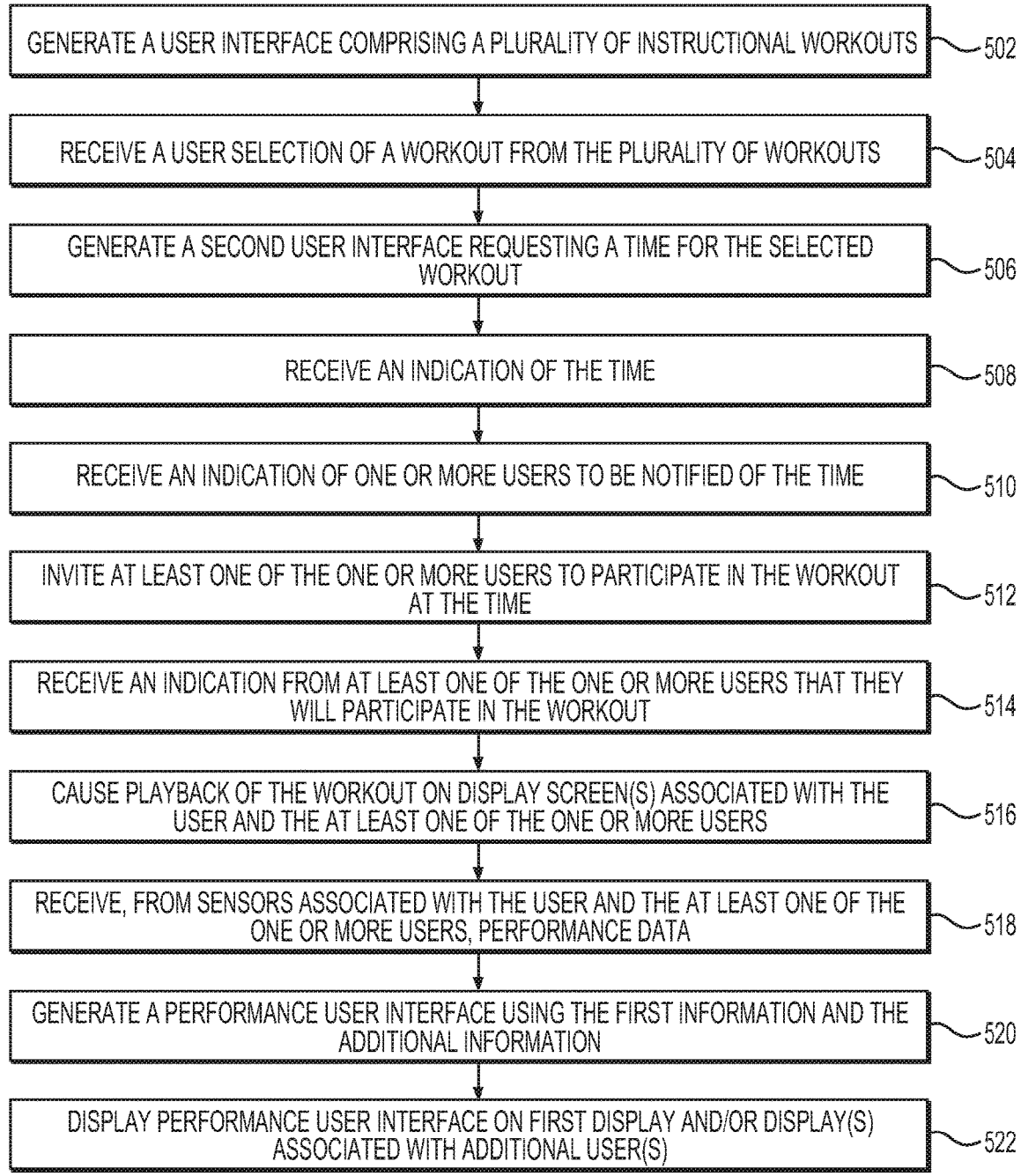
FIG. 5 illustrates a flow chart corresponding to another example method of the present disclosure.

FIG. 5 is yet another example method 500 according to implementations of this disclosure. For example, the method 500 may allow a user to coordinate exercising with other users using previously-recorded workout routines or classes. As described above with respect to the method 100 shown in FIG. 1, in various example embodiments, a processor of the present disclosure may be programmed and/or otherwise configured to generate and provide various user interfaces to a plurality of users such that the users may participate in live or archived workouts using the exercise machine. Accordingly, such a processor (either a remote processor or a processor local to one or more of the exercise machines) may perform one or more of the operations described herein with respect to the method 500.

In accordance with the method 500, at 502, a processor may generate a user interface comprising a plurality of instructional workouts. In example implementations, the instructional workouts are prerecorded workouts. The user interface may display the workouts in any conventional manner, including an array, a list, or some other arrangement.

At 504, the processor may receive a user selection of a workout from the plurality of workouts. In example implementations, selection of the workout may allow the user to commence viewing and/or participating in the workout. However, in other aspects of this example method, selection of the workout may provide an updated user interface that allows a user (e.g., a first user) to schedule when the user will participate in the workout. In any of the examples described herein, at 504, the method 500 may include receiving, with a processor (e.g., the remote processor described above) in communication with a first exercise machine, a first request for a pre-recorded exercise class or other such workout. In such examples, at 504 the first request may be provided by a first user of the first exercise machine.

More specifically, at 506, the processor may generate a second user interface requesting a time for the selected workout. In implementations of this disclosure, at 506, the processor may cause a calendar or other similar graphic to be displayed on the user interface. In addition to the calendar, the processor may also prompt the first user to select a date and/or time for the workout. In any of the examples described herein, at 506, the method 500 may include providing a scheduling request to the first exercise machine and via a network. In such examples, at 506 the scheduling request may be requesting at least one of a proposed date and a proposed time for providing the exercise class.

At 508, the processor may receive an indication of the time, and at 510 the processor may receive an indication of one or more second users to be notified of the time. For example, at 510, the processor may determine friends or other users associated with the scheduling first user. Alternatively, the interface generated at 506 may also include a prompt or other control allowing a first user to enter information about other users to be invited to work out at the selected time. In any of the examples described herein, at 508, the method 500 may include receiving a response to the scheduling request noted above with respect to 506. In such examples, at 508 the response may be received from the first exercise machine and via the network. Additionally, at 508 the response to the scheduling request may indicate the at least one of the proposed date and the proposed time.

At 512, based on the indication of the one or more second users received at 510, the processor may invite at least one of the one or more second users to participate in the workout at the time. Thus, as in the user interface illustrated in FIG. 2, and discussed in detail above, users other than the scheduling first user may receive an indication of the scheduled workout. The indication or message may also include the option to indicate an intent to join the organizer at the time, e.g., to accept the invitation to work out with the first user. In any of the examples described herein, at 512, the method 500 may include providing a notification to a second user via the network. In such examples, at 512 the notification may indicate the exercise class, and the at least one of the proposed date and the proposed time.

At 514, the processor may receive an indication from at least one of the one or more second users that they will participate in the workout. As described above, one or more of the second users may respond to an invitation with their intent to participate in the workout. In any of the examples described herein, at 514, the method 500 may include receiving a response to the notification provided at 512. In such examples, at 514 the response may indicate that the second user will participate in the exercise class at the at least one of the proposed date and the proposed time.

At 516, the processor may cause playback of the workout on the display associated with the first user and the at least one of the one or more second users. For instance, at the previously indicated time, the workout may be streamed to each of the second users who has indicated they would like to participate in the workout. In other embodiments, at the allotted time, one or more of the participants may provide instruction to begin the workout. Such instruction may come from the first user, i.e., the user who organized the workout in the first instance, or from one of the second users. In any of the examples described herein, at 516, the method 500 may include providing a video file via the network, to the first exercise machine and to a second exercise machine of the second user, at the at least one of the proposed date and the proposed time. In such examples, at 516 the video file may comprise audio content and video content associated with the exercise class. Further, at 516, display of the video file via a display of the second exercise machine may be synchronized (e.g., temporally, in real time) with display of the video file via a display of the first exercise machine.

At 518, after the workout has commenced, the processor may receive performance data from sensors associated with the first user and the at least one of the one or more second users. For example, the processor may receive a plurality of sensor information associated with the first user and/or the second users participating in the workout. Such sensor information may include, for example, at least one of speed, incline, heart rate, distance, hydration, respiration, output, cadence, and/or any other performance metrics or other parameters described herein. It is understood that such first sensor information may be received by the processor at 312, via one or more networks, communications interfaces, mobile devices, wearable devices, monitors, and/or other devices used to connect the processor with the user's exercise machine, which may be remote from the processor.

At 520, the processor may generate a performance user interface using the first information and the additional information. For instance, at 316, the processor may determine a first score for the first user based at least partly on the first sensor information received at 314. For example, the processor may use such information as respective inputs into one or more neural networks, algorithms, look-up tables, and/or other components in order to generate a corresponding score. In such examples, the score determined at 520 may comprise a current output of the first user. For example, as noted above such output may comprise a metric indicative of the energy expended by the first user during the exercise class and/or other such workout. In some examples, such an output may be calculated and/or otherwise determined based at least partly on a speed at which the first user is peddling, and a resistance value, brake value, and/or other value indicative of a particular setting of a stationary bicycle. Alternatively, in embodiments in which the exercise machine comprises a treadmill, such an output may be determined based at least partly on an incline of the deck, a speed of the belt, a resistance of the belt, and/or other factors. It is understood that the score determined at 520 may include one or more additional values such as an average output of the user, a total output of the user, a current to cadence, an average cadence, a current resistance, an average resistance, a current speed, an average speed, a distance, a number of calories burned, and/or any other similar metric. Further, at 520, the processor may determine additional scores corresponding to each of the respective one or more second users participating in the exercise class and/or other workout. In any of the examples described herein, the output, performance metric score, and/or other score determined at 520 may comprise any of the performance metrics or other scores described above with respect to 316 (FIG. 3). Further, in any of the examples described here, at 520 the processor may determine the score using any of the algorithms, components, or processes described above with respect to 316 (FIG. 3). In such examples, the operations performed at 520 may be substantially similar to and/or the same as those described above with respect to 316 (FIG. 3).

At 522, the processor may display the performance user interface. For example, the performance user interface may comprise a leaderboard or other comparative graphic that shows relative performance of the first user and the one or more second users. The leaderboard may be one of the leaderboards 402*a*, 402*b* discussed above.

Figure 6:
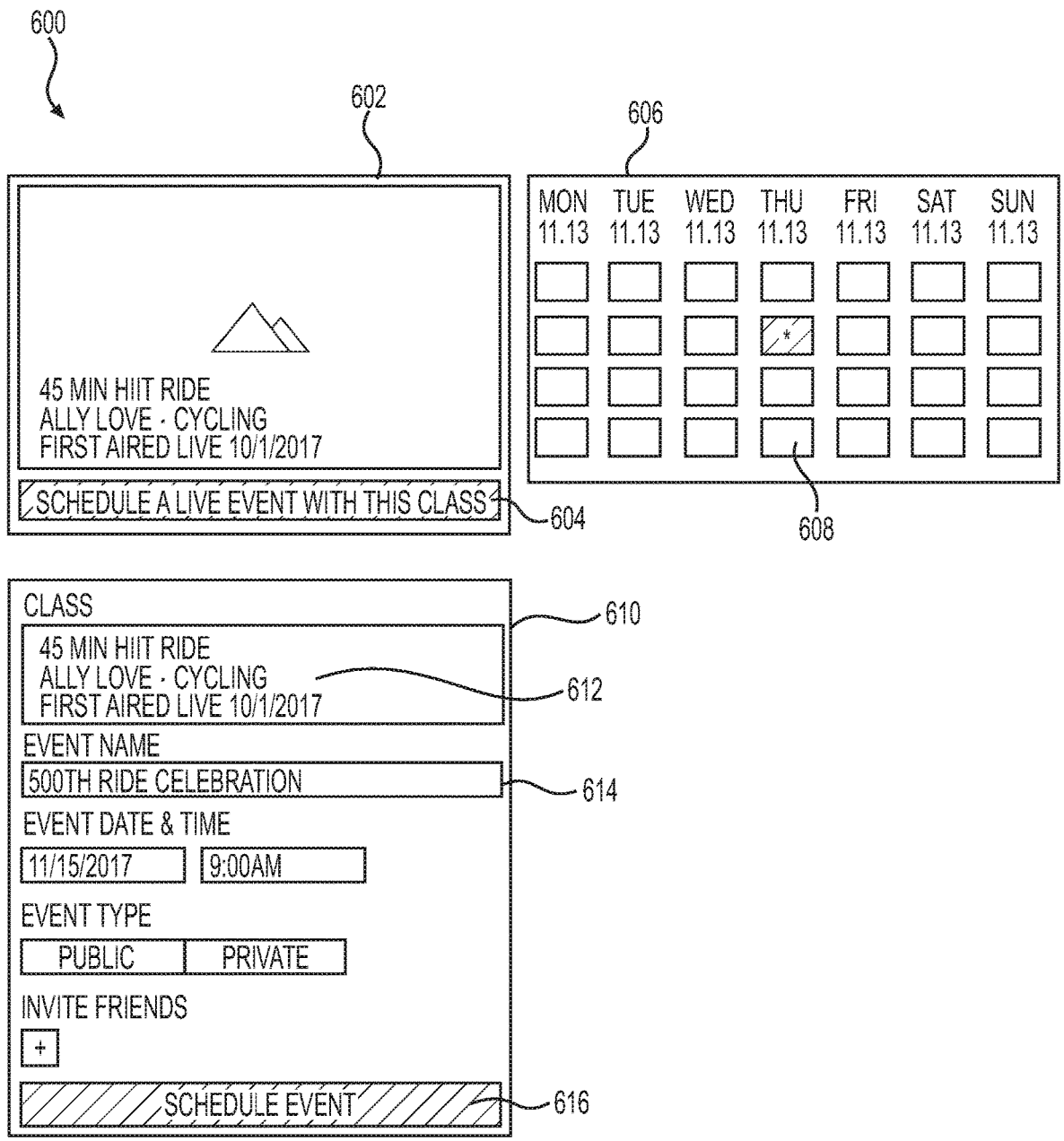
FIG. 6 illustrates an example user interface of the present disclosure. Aspects of the user interface shown in FIG. 6 may correspond to the method described herein with respect to FIG. 5.

FIG. 6 illustrates an example user interface 600 useful for implementing one or more aspects of the method 500. More specifically, the user interface 600 may be rendered in response to a user selecting a class, e.g., the pre-recorded class indicated at 602. The representation 602 of the class may also include a control 604 selectable by a user to schedule the class 602. For example, selection of the control 604 may cause display of a window 606 that includes a calendar 608, via which a user may select a date to schedule the class. Upon selecting the date via the calendar 608, for example, a scheduling window 610 may be displayed in the interface 600. The scheduling window 610 may include information about the class, e.g., duration, a title, an instructor identifier, a "first-aired" date, or the like. The scheduling window 610 may also include additional interface elements 614 via which the user may enter or edit an event name, the date and time, and the event type. Elements 614 also may be provided that allow the user to invite other users to join them for the scheduled workout. More or fewer interface elements 614 may be provided, as will be appreciated. The window 610 also includes a control 616 via which the user may confirm scheduling of the workout. For example, selecting the control 616 may send information about the workout to a calendaring application associated with the user and/or may send an invitation to associated users. The associated users may be selected by user during scheduling and/or may be identified as associated with the user, as described previously in this disclosure.

Figure 7:
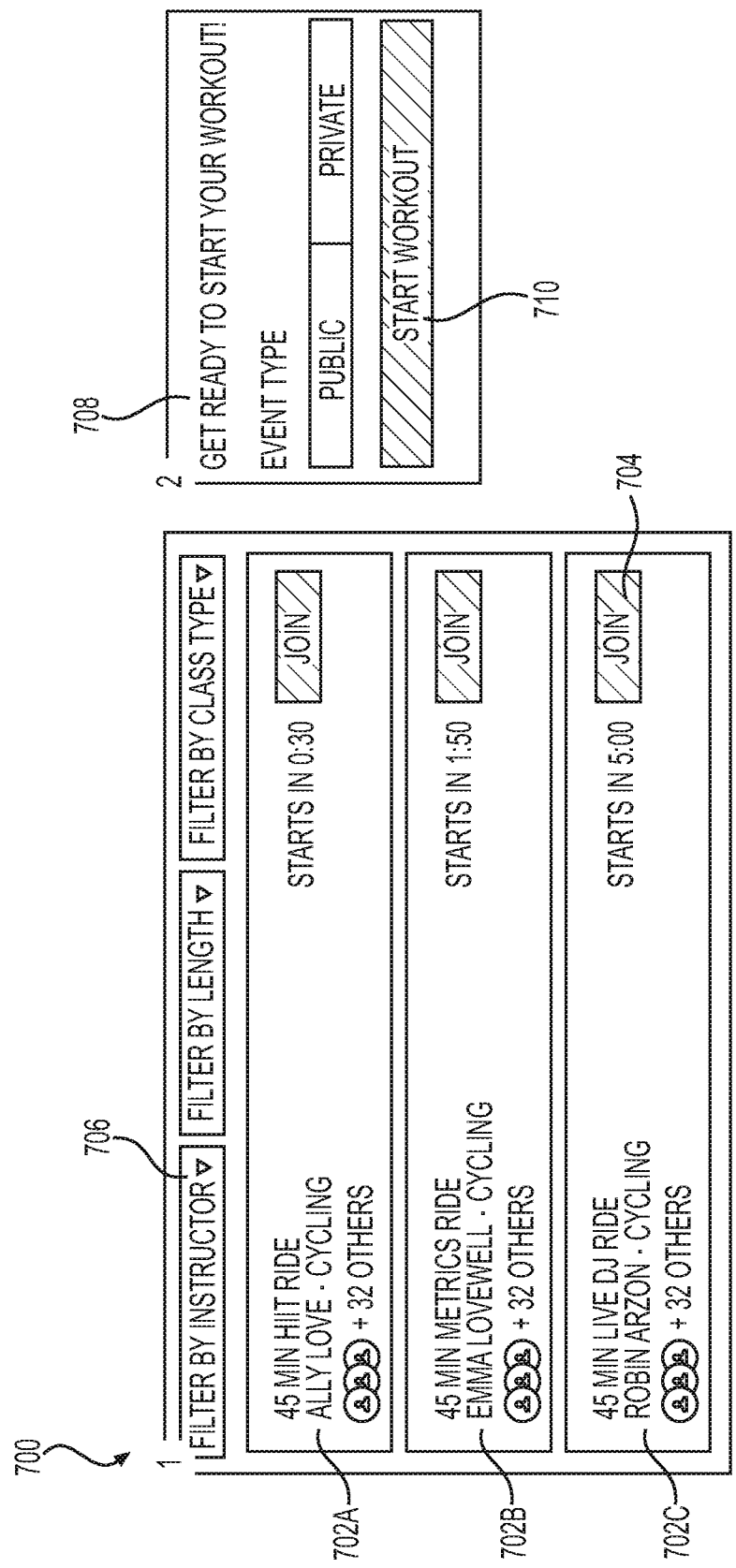
FIG. 7 illustrates an example user interface of the present disclosure. Aspects of the user interface shown in FIG. 7 may correspond to the method described herein with respect to FIG. 5.

FIG. 7 illustrates another user interface 700 in which scheduled events, such as those scheduled via the process 500, may be presented to users. For instance, the user interface 700 includes a listing of available-to-join classes, including classes identified at 702*a*, 702*b*, 702*c*. The class listings may be added to the interface by selecting the icon 616 in FIG. 6, for example. Each class representation includes a control 704 via which a user may join the class. If the class is already underway, the user may be immediately presented with the video playback, synchronized with playback on other participating users' devices, generally as discussed above. For yet-to-begin classes, the listings on the user interface 200 may include a time until the playback starts. Users may be provided with reminders as the time approaches. The list of classes 702*a*, 702*b* may be configurable. For example, 706 represents example filters that may be applied to the listing. As also illustrated in FIG. 7, a window 708 may also be provided to allow the user to start a class. For example, the window 708 may be presented to the user upon selection of the "join" control 704. The window 708 may also include a selectable control 710 that allows the user to start the workout. In response to selecting the control 710, the exercise machine may be configured to begin the workout and/or to join an already-in-progress playback of the workout.

It is understood that in any of the examples described herein, by at least one of generating a user interface comprising a plurality of workouts (at 502), generating a user interface requesting a time for a selected workout (at 506), inviting at least one or more additional users to participate in the workout (at 512), causing the playback of the workout on display screens associated with a first user and at least one or more additional users (at 516), and/or facilitating other operations described herein, the method 500 described with respect to FIG. 5 may be useful in reducing traffic and/or public transportation usage. As a result, the networked home-based exercise machines of the present disclosure utilized in association with the method 500 may contribute to reducing exhaust emissions, resource usage, and other negative environmental impacts associated with automobiles and other traditional modes of transportation. Additionally, since the example home-based networked exercise machines utilized in association with the method 500 eliminate the need for users to travel to a gym in order to participate in the selected workout, lost commuting time is eliminated, and the users associated with the method 500 are left with more time in their day. Accordingly, the quality of life of such users may be improved.

The clauses set forth below are illustrative of example embodiments of the present disclosure. One or more of the clauses below may be combined, in whole or in part, in any order and in accordance with embodiments presently envisioned.

A. A method includes receiving, with a processor in communication with a first exercise machine, a first request for an exercise class, the first request being provided by a first user of the first exercise machine; providing a video file comprising audio content and video content associated with the exercise class to the first exercise machine, and via a network; providing a notification to a second user via the network, the notification indicating that the first user has chosen to participate in the exercise class; receiving, with the processor and via the network, a second request for the exercise class, the second request being provided by the second user; and based at least partly on the second request, providing the video file to a second exercise machine of the second user via the network, wherein display of the video file via a display of the second exercise machine is synchronized with display of the video file via a display of the first exercise machine.

B. The method of clause A, further comprising providing a list of available exercise classes to the first exercise machine, wherein: the first request comprises a selection of the exercise class from the list of available exercise classes, the selection is received via the display of the first exercise machine, and the list of available exercise classes includes a first live class and a second pre-recorded class.

C. The method of any of the clauses above, either alone or in combination, further comprising identifying the second user, with the processor, based at least partly on an association between the first user and the second user.

D. The method of any of the clauses above, either alone or in combination, wherein the exercise class comprises a live class being performed by an instructor in real time, and wherein providing the video file to the first and second exercise machines comprises streaming the live class via the network.

E. The method of any of the clauses above, either alone or in combination, wherein the notification comprises at least one of an email, an SMS notification, a push notification, and a user interface pop-up notification.

F. The method of any of the clauses above, either alone or in combination, further comprising receiving a request for information associated with the exercise class, wherein: the request for information is received from the second exercise machine via the network, and the request for information is received based at least partly on a selection of an interactive control provided by the display of the second exercise machine.

G. The method of any of the clauses above, either alone or in combination, further comprising providing a status indication to the second exercise machine and via the network, the status indication comprising one of an amount of time until the exercise class begins, or an amount of elapsed time associated with the exercise class.

H. The method of any of the clauses above, either alone or in combination, further comprising providing an availability indication to the second exercise machine and via the network, the availability indication comprising a number of available spots left for additional users in the exercise class.

I. The method of any of the clauses above, either alone or in combination, further comprising providing a notification to the first exercise machine and via the network, the notification indicating that the second user has joined the exercise class.

J. The method of any of the clauses above, either alone or in combination, further comprising: providing first performance data, associated with the first user participating in the exercise class, to the second exercise machine via the network; and providing second performance data, associated with the second user participating in the exercise class, to the first exercise machine via the network.

K. A method includes receiving, with a processor in communication with a first exercise machine, a first request for a pre-recorded exercise class, the first request being provided by a first user of the first exercise machine; providing a video file comprising audio content and video content associated with the exercise class to the first exercise machine, and via a network; providing a notification to a second user via the network, the notification indicating that the first user began participating in the exercise class; receiving, with the processor and via the network, a second request for the exercise class, the second request being provided by the second user after the first user began participating in the exercise class; based at least partly on the second request, providing the video file to a second exercise machine of the second user via the network; receiving, with the processor and via the network, first information from the first exercise machine, the first information indicating one or more performance metrics of the first user determined during performance of the exercise class; generating a performance metric score of the first user based at least partly on the first information, the performance metric score being indicative of an amount of energy expended by the first user during performance of the exercise class; and providing the performance metric score to the first exercise machine via the network.

L. The method of any of the clauses above, either alone or in combination, wherein display of the video file via a display of the second exercise machine is synchronized with display of the video file via a display of the first exercise machine.

M. The method of any of the clauses above, either alone or in combination, further comprising identifying the second user, with the processor, based at least partly on an association between the first user and the second user.

N. The method of any of the clauses above, either alone or in combination, the one or more performance metrics of the first user comprising at least one of speed, incline, heart rate, distance, hydration, respiration, output, and cadence, and wherein the one or more performance metrics is determined by at least one of a sensor of the first exercise machine, a device worn by the first user, and a mobile device of the first user.

O. The method of any of the clauses above, either alone or in combination, further comprising: receiving, with the processor and via the network, second information from the second exercise machine, the second information indicating one or more performance metrics of the second user determined during performance of the exercise class; generating a performance metric score of the second user based at least partly on the second information, the performance metric score of the second user being indicative of an amount of energy expended by the second user during performance of the exercise class; providing the performance metric score of the second user to the first exercise machine via the network; and providing the performance metric score of the first user to the second exercise machine via the network.

P. The method of any of the clauses above, either alone or in combination, wherein providing the performance metric score of the second user to the first exercise machine comprises generating a leaderboard, the leaderboard including the performance metric score of the first user and the performance metric score of the second user.

Q. The method of any of the clauses above, either alone or in combination, wherein the leaderboard further includes performance metric scores of a plurality of additional users that participated in the exercise class prior to the first user.

R. A method includes receiving, with a processor in communication with a first exercise machine, a first request for a pre-recorded exercise class, the first request being provided by a first user of the first exercise machine; providing a scheduling request to the first exercise machine and via a network, the scheduling request requesting at least one of a proposed date and a proposed time for providing the exercise class; receiving a response to the scheduling request from the first exercise machine and via the network, the response to the scheduling request indicating the at least one of the proposed date and the proposed time; providing a notification to a second user via the network, the notification indicating the exercise class, and the at least one of the proposed date and the proposed time; receiving a response to the notification indicating the second user will participate in the exercise class at the at least one of the proposed date and the proposed time; and providing a video file via the network, to the first exercise machine and to a second exercise machine of the second user, at the at least one of the proposed date and the proposed time, the video file comprising audio content and video content associated with the exercise class, wherein display of the video file via a display of the second exercise machine is synchronized with display of the video file via a display of the first exercise machine.

S. The method of any of the clauses above, either alone or in combination, further comprising receiving, with the processor and via the network, first information from the first exercise machine, the first information indicating one or more performance metrics of the first user determined during performance of the exercise class; generating a performance metric score of the first user based at least partly on the first information, the performance metric score being indicative of an amount of energy expended by the first user during performance of the exercise class; providing the performance metric score to the first exercise machine via the network; and providing the performance metric score to the second exercise machine via the network.

T. The method of any of the clauses above, either alone or in combination, further comprising: receiving an indication of the second user from the first exercise machine and via the network; and providing the notification to the second user based at least partly on the indication of the second user.

CONCLUSION

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims. Further, various aspects of the different example embodiments described herein may be combined, in whole or in part, and in any order without departing from the spirit and scope of the present invention.

Moreover, as noted throughout the present disclosure, example embodiments described herein provide an inherently technical solution to various technical and societal problems associated with heightened traffic levels. For instance, it is understood that gym-based exercise classes require multiple participants to travel to and from the gym to participate in such exercise classes, and such travel can increase local traffic and/or can tax public modes of transportation. Such increased traffic can be a nuisance, and the elevated exhaust emissions and resource usage (gasoline, diesel fuel, natural gas, electricity, etc.) associated with such increased traffic levels can be harmful to the environment. Additionally, the time and distance associated with traveling to and from the gym to participate in such exercise classes can be a deterrent for some potential participants.

Example embodiments of the present disclosure provide an inherently technical solution to the environmental, societal, and other problems described herein by providing home-based exercise machines that facilitate live streaming of instructional content (e.g., exercise classes or other workouts), streaming of archived instructional content, socially networked audio and video chat, networked performance metrics, and a range of other features. In particular, the home-based networked exercise machines of the present disclosure enable users to participate in exercise classes or other workouts from home, and without having to travel to and from a gym. As a result, traffic and/or public transportation usage may be reduced, thereby resulting in a corresponding reduction in exhaust emissions, resource usage, and other negative environmental impacts. Additionally, since the lost commuting time associated with traveling to and from the gym is eliminated by the example home-based networked exercise machines and exercise systems of the present disclosure, the disclosed exercise machines and/or exercise systems may improve the quality of life of users by enabling such users to re-gain commuting time that would otherwise be wasted or lost.

What is claimed is:

1. A method, comprising:
 receiving, with a processor in communication with a first exercise machine, a first request for an exercise class, the first request being provided by a first user of the first exercise machine;
 providing a video file comprising audio content and video content associated with the exercise class to the first exercise machine, and via a network;
 providing a notification to a second user via the network, the notification indicating that the first user has chosen to participate in the exercise class;
 receiving, with the processor and via the network, a second request for the exercise class, the second request being provided by the second user; and
 based at least partly on the second request, providing the video file to a second exercise machine of the second user via the network, wherein display of the video file via a display of the second exercise machine is synchronized with display of the video file via a display of the first exercise machine.

2. The method of claim 1, further comprising providing a list of available exercise classes to the first exercise machine, wherein:
 the first request comprises a selection of the exercise class from the list of available exercise classes,
 the selection is received via the display of the first exercise machine, and
 the list of available exercise classes includes a first live class and a second pre-recorded class.

3. The method of claim 1, further comprising identifying the second user, with the processor, based at least partly on an association between the first user and the second user.

4. The method of claim 1, wherein the exercise class comprises a live class being performed by an instructor in real time, and wherein providing the video file to the first and second exercise machines comprises streaming the live class via the network.

5. The method of claim 1, wherein the notification comprises at least one of an email, an SMS notification, a push notification, and a user interface pop-up notification.

6. The method of claim 1, further comprising receiving a request for information associated with the exercise class, wherein:
 the request for information is received from the second exercise machine via the network, and
 the request for information is received based at least partly on a selection of an interactive control provided by the display of the second exercise machine.

7. The method of claim 1, further comprising providing a status indication to the second exercise machine and via the network, the status indication comprising one of an amount of time until the exercise class begins, or an amount of elapsed time associated with the exercise class.

8. The method of claim 1, further comprising providing an availability indication to the second exercise machine and via the network, the availability indication comprising a number of available spots left for additional users in the exercise class.

9. The method of claim 1, further comprising providing a notification to the first exercise machine and via the network, the notification indicating that the second user has joined the exercise class.

10. The method of claim 9, further comprising:
   providing first performance data, associated with the first user participating in the exercise class, to the second exercise machine via the network; and
   providing second performance data, associated with the second user participating in the exercise class, to the first exercise machine via the network.

* * * * *